United States Patent [19]
Winter et al.

[11] Patent Number: 4,790,623
[45] Date of Patent: Dec. 13, 1988

[54] OPTICAL FIBER CABLE ASSEMBLIES

[75] Inventors: Joseph Winter, New Haven; Michael J. Pryor, Woodbridge, both of Conn.

[73] Assignee: Olin Corporation, New Haven, Conn.

[21] Appl. No.: 16,609

[22] Filed: Feb. 19, 1987

Related U.S. Application Data

[63] Continuation of Ser. No. 497,522, May 24, 1983, abandoned, which is a continuation-in-part of Ser. No. 461,736, Jan. 28, 1983, abandoned.

[51] Int. Cl.$^4$ .................................................. G02B 6/44
[52] U.S. Cl. ................................. 350/96.23; 29/524; 72/52; 72/352
[58] Field of Search .......... 350/96.23; 29/460, 455 R, 29/522 R, 524; 228/21, 40; 72/51, 52, 352, 367

[56] References Cited

U.S. PATENT DOCUMENTS

| | | | |
|---|---|---|---|
| 1,387,199 | 8/1921 | Small | 138/171 |
| 2,306,945 | 12/1942 | Hebron | 72/52 |
| 2,373,531 | 4/1945 | Bertalan | 72/52 |
| 3,579,313 | 5/1971 | Pryor et al. | 29/196.2 |
| 3,607,151 | 9/1971 | Pryor et al. | 29/196.2 |
| 3,674,569 | 7/1972 | Pryor et al. | 148/11.5 A |
| 3,676,113 | 7/1972 | Pryor et al. | 75/146 |
| 3,754,431 | 8/1973 | Ramdohr | 72/416 |
| 3,967,399 | 7/1976 | Heinold et al. | 37/142 A |
| 4,166,670 | 9/1979 | Ramsay | 350/96.23 |
| 4,257,675 | 3/1981 | Nakagome et al. | 350/96.23 |
| 4,275,294 | 6/1981 | Davidson | 250/227 |
| 4,341,440 | 7/1982 | Trezeguet et al. | 350/96.23 |
| 4,349,243 | 9/1982 | Amano et al. | 350/96.23 |
| 4,372,792 | 2/1983 | Dey et al. | 156/48 |
| 4,383,354 | 5/1983 | Saurenman et al. | 29/522 R |
| 4,432,605 | 2/1984 | Niiro et al. | 350/96.23 |
| 4,437,729 | 3/1984 | Parfree et al. | 350/96.23 |
| 4,460,419 | 7/1984 | Parfree et al. | 156/56 |
| 4,477,147 | 10/1984 | Winter et al. | 350/96.23 |
| 4,491,463 | 1/1985 | Weinstein et al. | 65/2 |
| 4,498,917 | 2/1985 | Weinstein et al. | 65/2 |
| 4,573,253 | 3/1986 | Smith et al. | 29/460 |
| 4,577,925 | 3/1986 | Winter et al. | 350/96.23 |
| 4,578,985 | 4/1986 | Winter | 72/467 |
| 4,579,420 | 4/1986 | Winter et al. | 350/96.23 |
| 4,580,874 | 4/1986 | Winter et al. | 350/96.21 |
| 4,585,304 | 4/1986 | Winter et al. | 350/96.21 |
| 4,594,766 | 6/1986 | Smith, Jr. et al. | 29/460 |
| 4,611,748 | 9/1986 | Winter et al. | 228/170 |
| 4,652,323 | 3/1987 | Butt | 156/51 |
| 4,711,388 | 12/1987 | Winter et al. | 350/96.23 X |

FOREIGN PATENT DOCUMENTS

| | | |
|---|---|---|
| 2529466 | 2/1976 | Fed. Rep. of Germany . |
| 396285 | 4/1909 | France . |
| 1038534 | 8/1966 | United Kingdom . |
| 1477680 | 6/1977 | United Kingdom . |
| 1479427 | 7/1977 | United Kingdom . |
| 1583520 | 1/1981 | United Kingdom . |

OTHER PUBLICATIONS

Begeman et al., *Manufacturing Processes*, Sixth Edition, John Wiley and Sons, Inc., 1957, pp. 281–285.
Wilkins, "How Small Can an Electro-Optical Transoceanic Cable Be?", International Telemetry Society Conference, San Diego, California, Oct. 13–15, 1981, pp. 1–14.

*Primary Examiner*—John D. Lee
*Attorney, Agent, or Firm*—Gregory S. Rosenblatt; Paul Weinstein

[57] ABSTRACT

A hollow tubular structure having edges held in close proximity by residual compressive forces in the material forming the tubular structure is formed by first drawing a metal or metal alloy strip through a first die and forming an open tube section and then drawing the open tube section through a second die. The hollow tubular structures have particular utility in optical fiber communication cable constructions.

3 Claims, 2 Drawing Sheets

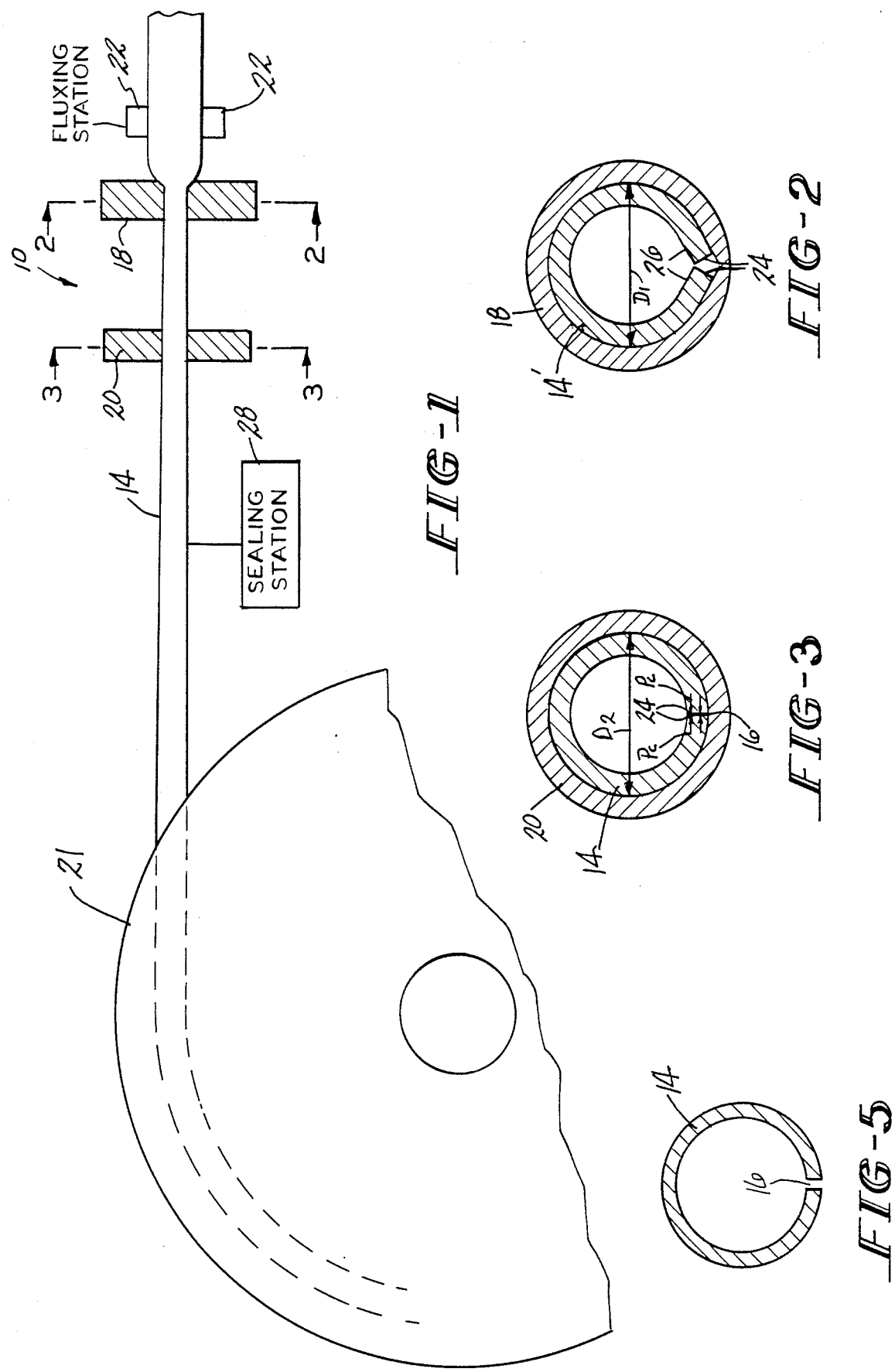

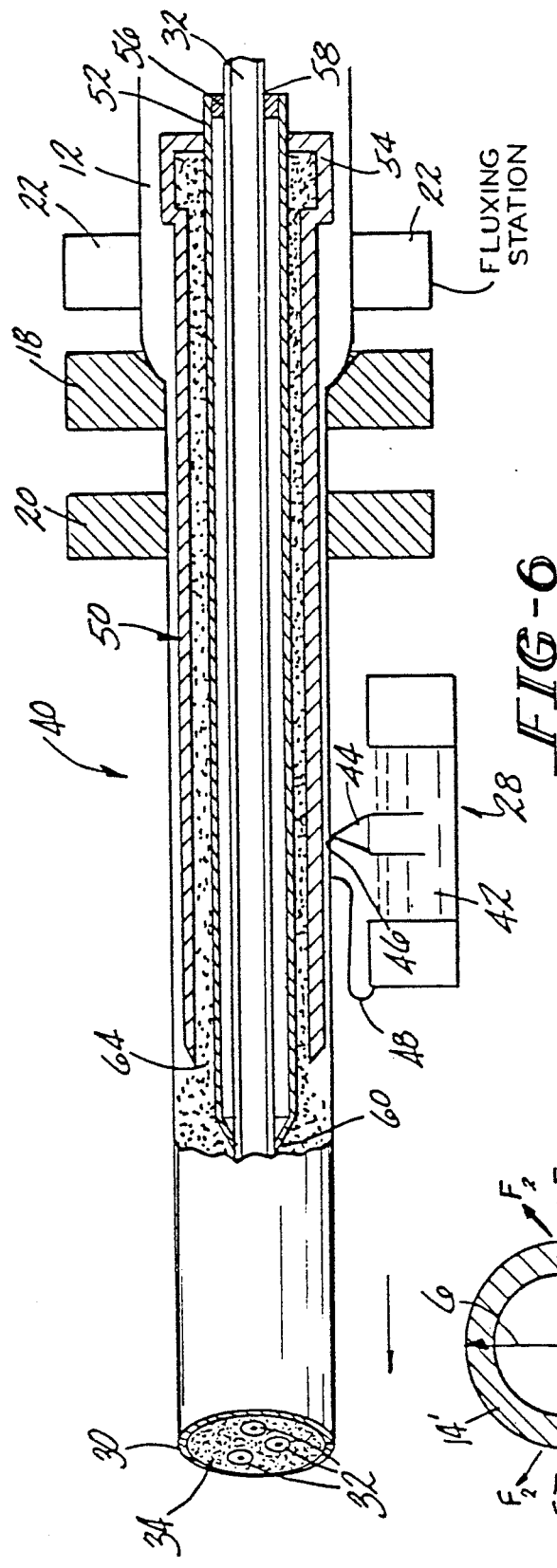
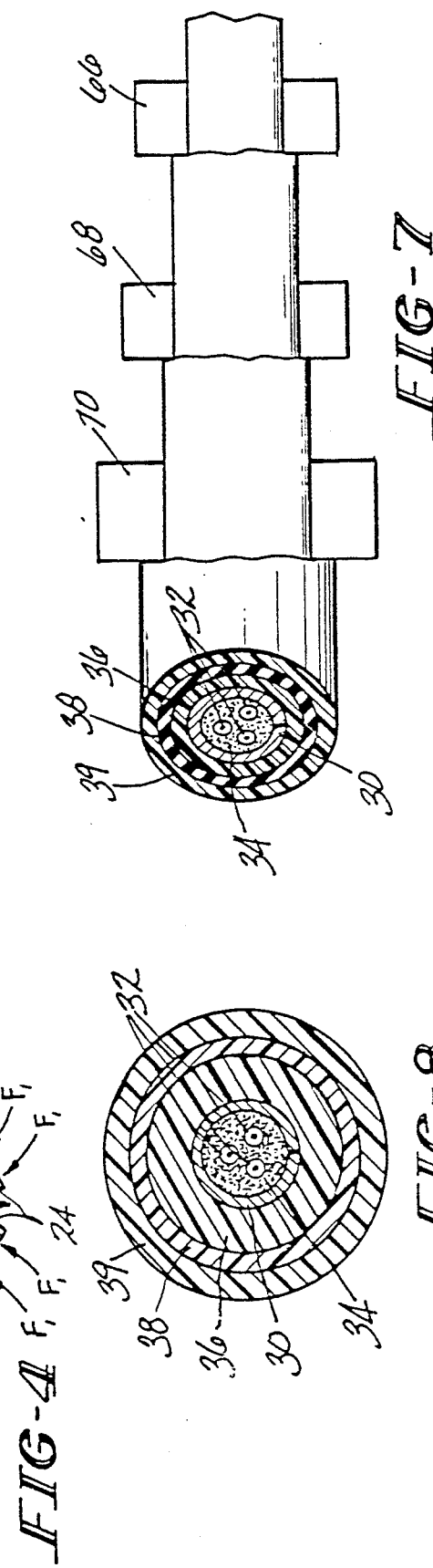
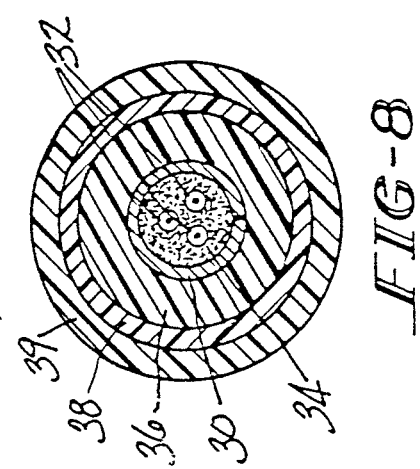

OPTICAL FIBER CABLE ASSEMBLIES

CROSS-REFERENCE TO RELATED APPLICATIONS

This application is a continuation, of application Ser. No. 497,522, filed May 24, 1983, which is a continuation-in-part of Ser. No. 461,736, filed Jan. 28, 1983, both abandoned.

This application is also related to U.S. Ser. No. 272,154, filed June 10, 1981, now abandoned, for METHOD AND APPARATUS FOR ASSEMBLING AN OPTICAL FIBER COMMUNICATION CABLE; U.S. Ser. No. 413,846, filed Sept. 1, 1982, now U.S. Pat. No. 4,508,423, which is a continuation-in-part of U.S. Ser. No. 324,242, filed Nov. 23, 1981, now abandoned, for METHOD AND APPARATUS FOR ASSEMBLING AN OPTICAL FIBER COMMUNICATION CABLE; U.S. Ser. No. 395,443, filed July 6, 1982, now U.S. Pat. No. 4,479,702, for METHOD AND APPARATUS FOR ASSEMBLING A COMPACT MULTI-CONDUCTOR OPTICAL FIBER COMMUNICATION CABLE; U.S. Ser. No. 408,087, filed Aug. 13, 1982, now abandoned, for OPTICAL FIBER COMMUNICATION CABLES AND METHOD AND APPARATUS FOR ASSEMBLING SAME; and U.S. Ser. No. 430,069, filed Sept. 30, 1982, now U.S. Pat. No. 4,557,559 for PROCESS FOR DIE FORMING A TUBULAR MEMBER AT A REDUCED DRAWING FORCE.

The invention disclosed herein relates to a process and apparatus for fabricating hollow tubular structures. The tubular structures fabricated by the process and apparatus of the instant invention have particular utility in optical fiber communication cable constructions.

In forming tubular structures that act as protective members, it is desirable that the tube forming technique create a structure that may be readily sealed. Conventional tube forming techniques often form tubes having seams characterized by widely spaced apart edges. Sealing such seams in an effective manner while providing the tube with a desired set of mechanical properties can be extremely difficult. The mechanical properties exhibited at the sealed wide seam are substantially those of the sealing or brazement material. Generally, these mechanical properties will not correspond to the desired set of properties. The volume of sealing material required to effect the joint may further degrade the joint mechanical properties, particularly where a large volume of sealing material is required to effect the seam joint. In such a situation, air bubbles or voids may be created in the sealing material during the sealing process. During later processing, these bubbles or voids may be the source of cracks which degrade the mechanical properties and the hermeticity of the tubular structure. Other problems include sealing material entering the tube through the gap, solidifying on internal surfaces and creating internal hazards to any component inserted into the structure.

It is highly desirable that the formed tubular structure have a seam with edges in relatively close proximity. Such narrow gap structures tend to have better mechanical properties than wide gap structures. While it is possible to use clamping devices to maintain the seam edges of wide gap structures in close proximity, systems which utilize such clamping devices require constant monitoring to insure that the clamping devices hold the edges in the proper relationship.

In communication cable applications, tubular structures are required to house electrical and other components and to act as a barrier to fluids and other environmental conditions, as a strength member and/or as an electrical conductor. When tubular structures are used in such communication cable applications, they often have to exhibit high electrical conductivity and strength properties. In addition, any seams in the structures have to be capable of being completely sealed. In order that the formed tube may function in one or more of the above capacities, it is desirable that the tube forming technique create a tight seam which is capable of being closed with a minimal amount of sealing material. Tubes having tight seams may be sealed principally by capillary action which is highly desirable since it reduces the likelihood of creating internal hazards that may adversely affect components such as optical fibers or electrical conductors inserted in the tube.

The concept of using a welding bell to form a flat strip into a hollow tubular structure is well known in the prior art. In this technique, a metal or metal alloy strip generally is heated to a temperature at which its edges may be welded together. An end of the strip is gripped by an appropriate mechanical device, such as tongs, and is pulled through a welding bell. As the strip is pulled through the welding bell, the strip is formed into a circular shape and the edges are welded together. *Manufacturing Processes*, Sixth Edition, by Begeman et al., John Wiley and Sons, Inc., 1957, pp. 281–285 discusses the use of a welding bell in butt welding processes.

The welding bell approach works best when the tubular structure being formed has a relatively large diameter to thickness ratio. In forming tubular structures for use in communication cable techniques, a hollow cylinder having a relatively small diameter to thickness ratio is required. In using a welding bell approach to form such hollow cylinders, elastic relaxation after forming could cause the cylinder to open up and form a seam with a relatively large gap. When high strength, low modulus materials are used to form the cylinder, the gap can be from about 5% to about 20% of the radius of the cylinder. Such a large gap would be difficult to close, particularly by capillary action.

Another tube forming technique known in the art roll forms a strip of metal or metal alloy into a tube. In this technique, the strip of metal or metal alloy passes through a series of roll assemblies. The roll assemblies incrementally close the edges of the strip until a tube is formed. Hereto, seams having relatively large gaps will be created in the tubular structures formed by this technique when the elastic constraints are relieved.

U.S. Pat. Nos. 4,257,675 to Nakagome et al., 4,275,294 to Davidson, 4,341,440 to Trezeguet et al. and 4,349,243 to Amano et al. and the paper "How Small Can an Electro-Optical Transoceanic Cable Be?" by G. Wilkins, International Telemetry Society Conference, San Diego, CA, Oct. 13–15, 1981 describe optical fiber cable constructions having roll formed optical fiber containment tubes. Another problem associated with using the roll forming technique in the fabrication of optical fiber containment tubes is the relatively high risk of the rolls forming the inner diameter of the tubes damaging any optical fiber or fibers within the tubes.

Other techniques for forming tubular structures for optical fiber cable constructions include extrusion, wrapping a metal tape around a core, and using draw plates. The Trezeguet et al. patent discloses an optical fiber cable having a protective metal casing about which an outer metal tube is formed by progressively skelping a metal tape and then drawing it down onto the metal casing.

British Pat. No. 1,477,680 to Slaughter et al. discloses providing a continuous coating of a metal or metal alloy about an optical fiber. The coating is preferably formed by the method described in U.K. Pat. No. 1,038,534 to Haywood. In that process the coating is formed by drawing the fiber through a slot containing molten metal or metal alloy. A deficiency of the metal coated fiber of Slaughter et al. and the process for forming it of Haywood is that the metal or alloy is essentially cast about the fiber and, therefore, will in practice have a relatively low strength associated with a cast material. Further, the buffer for the fiber must be formed of a material which will not melt at the temperature of the molten metal or alloy. The provision of a cast coating versus a wrought metal tube of this invention will result in the fibers of the British patents being less ruggedized and more susceptible to damage in use. Fiber optic elements presently employ plastic buffers which melt at relatively low temperatures as compared to the silica buffer utilized in the fiber optic elements of the British patents. Therefore, the process for forming the coating as described by Haywood would not be readily applicable to fiber optic elements used today employing plastic buffers.

In the British patent to Slaughter et al. and in British Pat. No. 1,479,427 to Dean et al. fiber optic cables are described which can employ a plurality of individually metal coated optical fiber elements. U.S. Pat. No. 4,166,670 to Ramsay is illustrative of fiber optic cable wherein fiber optic elements are supported within the interstices of a stranded non-optical strength member. The fiber optical elements employed in the cable of Ramsay are not individually armored.

U.K. Pat. No. 1,583,520 to Chapman and U.S. Pat. No. 4,372,792 to Dey et al. are illustrative of the use of dies for folding a metal tape into the shape of a tube about a fiber optic element or elements.

The tube forming approaches described in Davidson, Dey et al. and Slaughter et al. are believed to be particularly adapted for use with comparatively soft metal materials having relatively low strength. With such materials the folding approach described in these patents can provide a tube substantially closed as shown. However, when high strength tubing is employed, a folding approach results in excessive spring back after tube forming which causes a substantial gap at the seam. Therefore, the approaches described in the aforenoted patents are not well suited for use with high strength metals or alloys.

U.S. patent application Ser. Nos. 272,154 filed Jun. 10, 1981 and 413,846 filed Sept. 1, 1982, both to Winter et al., U.S. patent application Ser. No. 395,443 filed July 6, 1982 to Pryor et al., and U.S. patent application Ser. No. 430,069 filed Sept. 30, 1982 to Winter illustrate a die forming technique for forming a tubular structure for optical fiber cable constructions. In this approach, tension is applied to an end of a high strength metal or metal alloy strip to draw the strip through a die. In the die, the strip folds over and forms a tube having a longitudinal seam. After the tube forming operation has been completed, the seam is sealed using a suitable sealing technique. In U.S. patent application Ser. No. 408,087 filed Aug. 13, 1982 to Winter et al., a two die tube forming technique is described. In this technique, the strip is first pulled through a first die and formed into a U-shaped section and is then pulled through a second die in which the U-shaped section is closed to form a tube. Thereafter, the tube is sealed in an appropriate manner. While the die forming techniques described in these applications have proved to be quite satisfactory for the manufacture of optical fiber containment tubes, elastic relaxation after completion of the tube forming operation has occasionally created problems in obtaining a satisfactory seam joint.

In accordance with the present invention, a process and apparatus for forming tubular structures having tight seams from strips of metal or metal alloys are provided. The technique of the instant invention stresses the strip material during the tube forming operation so that the strip edges are placed in relatively close proximity and are held in that position by residual compressive forces within the material forming the tube.

By creating residual compressive forces that hold the edges in close proximity, a tight seam that is readily sealable is provided. In addition, elaborate clamping devices for holding the seam edges in close proximity during the sealing operation may be avoided. Another advantage to the technique of the instant invention is that the normal springback encountered after tube forming should be overcome by placing the edge portions in such elastic compression.

The tube forming process of the instant invention is essentially a two-step process. During the first step, a strip of metal or metal alloy is drawn through a die having an internal diameter such that an open tube section having major and minor diameters is formed. Preferably, the tube section is formed with a minor diameter smaller than the desired diameter of the final tubular structure. In the second step, a tube having the desired diameter is formed by drawing the open tube section through a second die. In the second die, the legs of the open section are bent so as to place them in edge to edge confrontation. By doing this, compressive forces are generated at the edges as a result of redirecting the springback forces. Upon removal from the second die, sufficient residual compressive forces will remain to hold the edges in close proximity.

If desired, the relatively tight seam formed by the edges may be sealed using an appropriate sealing technique. Preferably, any joint between the edges of the seam is formed principally by capillary action. In certain situations such as when only hydrostatic pressure is involved or an outer sealing construction is used, the seam joint may be omitted.

In order that the tubular structure may be placed into elastic compression during forming, the first die preferably has an inner diameter along its minor axis smaller than the desired diameter of the final tube structure. The inner diameter should be sufficiently small that compression will be introduced in the second die as elastic strain. However, the inner diameter of the first die should not be so small that the open tube section when pulled through the second die is subjected to forces which bring it into a plastic state instead of an elastic state. The ratio of the inner diameter of the second die to the minor diameter of the first die should be from about 1.02:1 to about 1.25:1, preferably from about 1.05:1 to about 1.15:1.

It has been found that the process of the instant invention has particular utility in forming tubular structures for housing optical fibers and/or electrical conductors used in communication cable constructions. These structures frequently require that the formed tube have a tight seam that is readily sealable. In addition, structures having a relatively small diameter to thickness ratio are required. The process and apparatus described herein are capable of forming tubes having such relatively small diameter to thickness ratios.

In forming an optical fiber communication cable using the tube forming technique of the instant invention, one or more optical fibers may be deposited into the tube, preferably after the tube seam has been sealed. If desired, a cushioning material such as a gel may be deposited into the tube. In addition, one or more outer layers may be fabricated around the formed tube.

When forming a tube for use in optical fiber communication cables, the tube preferably has a diameter to thickness ratio in the range of about 5:1 to about 25:1. Most preferably, the diameter to thickness ratio is in the range of about 10:1 to about 20:1.

It is an object of the present invention to provide a process and apparatus for forming a hollow tubular structure having a tight seam.

It is a further object of the present invention to provide a process and apparatus for forming a hollow tubular structure as above that may be sealed with improved hermeticity.

It is a further object of the present invention to provide a process and apparatus for forming a hollow tubular structure as above having particular utility in communication cables.

These and other objects will become more apparent from the following description and drawings.

Embodiments of the process and apparatus for forming tubular structures having a tight seam in accordance with the instant invention are shown in the drawings wherein like numerals depict like parts.

FIG. 1 is a schematic representation in partial cross section of an apparatus for die forming a tubular member from metal or metal alloy strip in accordance with the instant invention.

FIG. 2 is a cross-sectional view taken along lines II—II of FIG. 1 showing a first one of the dies of the apparatus and the tube section formed within the die.

FIG. 3 is a cross-sectional view taken along lines III—III of FIG. 1 of a second one of the dies of the apparatus and the formed tube within the die.

FIG. 4 is a cross-sectional view of a tube section preferably formed by the first die.

FIG. 5 is a cross-sectional view of a tubular structure formed in accordance with the instant invention.

FIG. 6 is a schematic representation in partial cross section of an apparatus for forming an optical fiber communication cable core incorporating the tube forming apparatus of the instant invention.

FIG. 7 is a schematic representation of an apparatus for forming outer protective layers about the optical fiber cable core formed by the apparatus of FIG. 6.

FIG. 8 is a cross-sectional view of an optical fiber communication cable formed in accordance with the instant invention.

In accordance with the present invention, it is proposed to form a tubular structure having a tight seam from a strip of metal or metal alloy. This is accomplished by stressing the strip material during the tube forming operation so that the edges are placed in elastic compression and held in close proximity by residual compressive forces.

Referring now to FIG. 1, an apparatus 10 for forming a strip 12 into a hollow tubular structure 14, such as a hollow cylinder, having a tight seam 16 is illustrated. Strip 12 is normally received in the form of a coil and comes from suitable payoff equipment not shown. The payoff equipment should be such that a back tension may be applied to the strip if desired.

Strip 12 may comprise a single length of material or may be a plurality of lengths joined together. If the strip 12 comprises a plurality of joined lengths, the lengths may be joined in any suitable manner. For example, conventional joining techniques such as brazing, soldering, welding and diffusion bonding may be used to bond the strips together.

Strip 12 may be formed from any metal or metal alloy that exhibits a desired set of properties. The desired properties would depend upon the ultimate use of the formed tubular structure. In fabricating containment tubes for communication cables, properties such as strength, formability and electrical conductivity are important. The strip 12 should have sufficient hardness to enable it to be formed into a tube by being drawn through a plurality of dies 18 and 20. Preferably, the strip 12 is in a wrought and partially work hardened condition, such as at least about 25% of its maximum hardness. In a most preferred condition, the strip 12 is at least about at its maximum hardness.

Prior to undergoing the tube forming operation of the instant invention, the strip 12 may be passed through a suitable cleaning system not shown for removal of contaminants. The cleaning system utilized will depend upon the metal or metal alloy forming the strip and the nature of the contaminants to be removed. Any suitable conventional cleaning system known in the art may be utilized.

Prior to being fed into the tube forming apparatus, the strip 12 preferably passes through a fluxing station 22. The fluxing station comprises any conventional means known in the art for applying any conventional flux preferably to the edges of the strip. Since the fluxing station is not absolutely necessary to form the tube 14, it may be omitted if desired.

The strip 12 is fed into the apparatus 10 by connecting it via any suitable means known in the art to a take-up reel 21. A tensile force may be applied to the strip to draw it through the forming dies 18 and 20 by any suitable pulling means not shown known in the art.

In order to achieve residual compression at the edges 24, the tube forming technique of the instant invention employs a two-step forming operation. The first step comprises drawing the strip 12 through a first die 18 which preferably forms an open tube section 14' such as that shown in FIGS. 2 and 4. In order that the desired compressive forces will be created in the final tubular structure, the tube section 14' should be formed to have a diameter less than the diameter desired for the tube 14. As a result of this, the tube section 14' will have a configuration with a major diameter 6, a minor diameter 8, and a pair of spaced apart legs 26 in close proximity. The minor diameter 8 will be the diameter less than the desired tube diameter. The major diameter 6 preferably intersects the seam 16 formed by the edges 24 and is preferably perpendicular thereto. As the strip 12 is drawn through the die 18, the die 18 exerts forces $F_1$ on the bottom of the tube section 14'. It is believed that these forces cause the production of residual stress forces $F_2$ in the upper portion of the tube section 14'. While tube section 14' has been described as an open tube section, it may also be described as a substantially closed tube section.

The strip 12 from which open tube section 14' is formed preferably has an initial cross-sectional area greater than the cross-sectional area of the formed tube. It has been found that by providing the strip with such an initial cross-sectional area, the desired compressive forces can be more easily created.

The second step comprises drawing the open tube section 14' through a die 20 having an inner diameter $D_2$ substantially equal to the desired diameter of the tube 14 to be formed. Die 20 is preferably a bending-expansion die. Within the die 20, the legs 26 are bent so that the edges 24 are placed into edge to edge confrontation. In addition, the major diameter of the section 14' is decreased to the desired tube diameter and the minor diameter of the tube section 14' is increased to the desired tube diameter.

By bending the legs 26 into edge to edge confrontation, the springback forces are caused to act in a direction such that compressive forces $P_c$ are generated at the edges 24. The compressive forces $P_c$ are a function of the modulus of elasticity of the tube material, the deflection, the tube wall thickness, and the tube diameter. The compressive forces create residual compressive forces in the material that hold the edges in close proximity when the tube 14 is removed from the die 20. The edges 24 in close proximity form a relatively tight seam 16 which can be readily sealed to give a tube formed by the technique of the instant invention improved hermeticity.

It is believed that the wall section of the tube 14 opposite the seam acts as the fulcrum of a spring and the stresses acting on that section create the compressive forces that hold the seam in place. It is possible using the technique of the instant invention to generate sufficient residual compressive forces that the edges 24 will be held together even after removal of the tube 14 from the die 20.

The tube 14 formed in the die 20 should have an outer periphery or circumference substantially equal to the outer periphery of the tube section 14'.

While the dies 18 and 20 may have any suitable configuration, the relationship between their respective diameters has been found to be quite important to performing the tube forming technique of the instant invention. Die 18 should have an inner diameter $D_1$ along its minor axis that is sufficiently smaller than the diameter of the tube 14 to be formed and the diameter $D_2$ of die 20 that compression will be introduced as elastic strain in die 20. However, the diameter $D_1$ should not be so small that the tube section 14' is subjected to large forces that place it in the plastic zone while it is being drawn through the die 20. If the tube section 14' were to be placed in the plastic zone, a plastic configuration would result instead of the desired elastic configuration. The ratio of the diameters $D_2:D_1$ should be from about 1.02:1 to about 1.25:1, preferably from about 1.05:1 to about 1.15:1.

After the tube 14 has been formed, it may be passed to a sealing station 28 for closing the seam 16. Sealing station 28 may comprise any conventional sealing apparatus for soldering, welding, brazing or applying any other suitable sealing technique. Preferably, seam 16 is filled with a suitable closing material such as solder. Preferably, the sealing material enters the seam by capillary action. A particularly suitable technique for soldering the seam 16 is shown in co-pending U.S. patent application Ser. Nos. 413,846 filed Sept. 1, 1982 and 497,535 filed May 24, 1983, both to Winter et al. which are hereby incorporated by reference (now U.S. Pat. Nos. 4,508,423 and 4,555,054, respectively). The Winter et al. '846 soldering technique will be in part described hereinafter.

To demonstrate the tube forming technique of the instant invention, a strip of copper alloy C63800 in hard condition was drawn through two dies in the manner discussed above and formed into a tube. The strip had an initial thickness of 0.025 in. and an initial width of 0.594 in. The first die had an inner diameter $D_1$ of 0.185 in. and a relief section whose notch was 0.020 in. larger in diameter. The second die had a diameter $D_2$ of 0.190 in. The formed tube had an outer diameter of 0.190 in., an inner diameter of 0.140 in., and a seam with a gap under 0.002 in.

Tubes formed in accordance with the process of the instant invention have been found to have particular utility in optical fiber communication cables. In an optical fiber cable, a hollow tube generally is used to form the cable core. The tube acts as a containment tube and metal armoring for protecting one or more optical fibers. As well as functioning in these capacities, the tube may function as an electrical conductor and/or a fluid barrier.

In the fabrication of metal tubes for such optical fiber cables, size, strength, formability and conductivity requirements are important considerations. Generally, the tubes are required to have relatively small diameter to thickness ratios so the overall cable construction may be as compact as possible. The strength and conductivity needs generally require the use of metal or metal alloys in a severe cold worked condition. This is particularly true when alloys of copper and stainless steel are used for the containment tubes. In addition, any seam formed during the tube forming operation should be readily sealable so that the tube is water tight and impermeable to environmental conditions. While brazements such as solder have adequately performed this sealing function, it is important that the seam be tight and that the brazement forming the joint enter principally by capillary action. By forming a joint in this manner, the joint will not seriously degrade the mechanical and electrical properties of the formed tube. Furthermore, the likelihood of the brazement seeping through and solidifying on the inner tube wall and thereby creating a hazard to any optical fiber or fibers contained therein is minimized.

The process of the instant invention has been found to be quite compatible with these considerations. The tube forming technique works very well in forming tubes having relatively small diameter to thickness ratios. In addition, the formed tube has a relatively tight seam that lends itself to being sealed by capillary action. Since the die forming technique of the instant invention prefers that the strip be in a work hardened condition, it also lends itself to the use of metal or metal alloys in a severe cold worked condition.

Referring now to FIG. 6, an optical fiber cable core fabricating apparatus 40 incorporating the die forming technique of the instant invention is illustrated. A strip 12 of metal or metal alloy is formed into a containment tube 30 in the manner previously described by drawing the strip preferably first through a fluxing station 22, then through a first die 18 to form an open tube section such as that of FIG. 4, and then through a second die 20 for forming a tube 30 having a tight seam such as that of FIG. 5.

After the tube 30 has been formed, it may be passed to a station 28 for sealing the seam. Station 28 may comprise any suitable sealing mechanism, i.e. soldering means, welding means, brazing means, etc. known in the art. In a preferred arrangement, station 28 comprises means for soldering the seam.

A supply of solder may be provided in a sump or bath 42. The solder may be fed in a conventional manner such as by a pump not shown to a soldering head 44 having an orifice 46. Preferably, the solder is fed through the soldering head 44 and orifice 46 at a pressure sufficient to create a spout of solder. As the tube 30 and the seam are passed over the spout of solder, the movement of the tube and surface tension tend to drive the solder into the seam interface formed by the edges 24. The solder capillaries up into and substantially fills the seam. After the solder solidifies, the tube is completely sealed. By sealing the tube in this fashion, the tube may be provided with a relatively high degree of hermeticity. Any suitable solder including silver solders, high-temperature solders, low-temperature solders such as lead-tin solder, lead-antimony solder, tin-antimony solder, etc., may be used to close the seam and the tube.

After passing over the soldering head 44, tube 30 should pass over a wiping device 48 for removing any excess solder. Wiping device 48 may comprise a spring wipe or any other suitable wiping mechanism.

During the tube forming and sealing operations, at least one optical fiber 32 and a cushioning material 34, if one is desired, may be located within a protective sheath or capillary means 50. The tube forming operation preferably takes place about the protective sheath 50. The sheath 50 is intended to prevent damage to the at least one fiber 32 and any cushioning material 34 during the tube forming and sealing operations and to prevent any cushioning material from seeping into the seam and adversely affecting the sealing operation. The sheath 50 may also function as a mandrel in those instances where one is required.

After the sealing operation has been completed and the solder has solidified, at least one optical fiber 32 and a cushioning material 34, if desired, are inserted into the tube 30. As used herein, the term inserted means released from the sheath and deposited into the sealed tube. If used, the cushioning material 34 preferably is inserted into the tube 30 just upstream of the insertion of the at least one optical fiber 32 into the tube.

In situations where both at least one optical fiber and a cushioning material are to be inserted into the tube 30, the protective sheath 50 preferably comprises a first chamber or passageway 52 through which the optical fiber or fibers 32 pass and a concentric second chamber or passageway 54 for inserting the cushioning material 34. Passageway 52 has a pressure seal 56 with an inlet opening 58 at a first end. The optical fiber or fibers 32 enter the passageway 52 through the opening 58. At the opposite end of passageway 52 is an outlet opening 60. Passageway 52 and outlet 60 guide the optical fiber or fibers 32 and deposit or release the fiber or fibers 32 into the tube 30. One advantage to releasing the fiber or fibers 32 into the tube after the sealing operation has been completed is that the risk of damage to the fiber or fibers as a result of the sealing operation is minimized.

While any suitable technique may be used to deposit the fiber or fibers 32 into the tube 30, it is preferred to deposit the fiber or fibers by pulling each fiber from one end by any suitable means not shown without applying any significant back tension. This may be accomplished through the use of a slack loop and dancer arrangement or any other desired technique wherein the fiber merely travels along with the tube 30 as the tube is formed. A result of the processes in accordance with this invention is that the length of each optical fiber 32 after fabrication exceeds the length of the tube by less than about 1%. Each fiber 32 is, therefore, in slight compression rather than in tension which would deleteriously affect its transmission properties. Since the fiber is fed into the tube during forming without substantial back tension, removal of the drawing force for forming the tube 30 causes the sheath material to elastically contract thereby providing the relative difference in length of the tube 30 versus the length of each fiber 32.

The passageway 54 for inserting cushioning material 34 into the tube preferably concentrically surrounds the passageway 52. The cushioning material 34 enters the passageway 54 through an inlet opening not shown preferably while under pressure. The passageway 54 has an outlet opening or exit nozzle 64 through which the cushioning material 34 flows into the tube. Passageway 54 extends a distance sufficient to insure that the cushioning material 34 does not flow into the tube member until after the solder has solidified. By waiting until after the solder has solidified to inject the cushioning material 34 into the tube 30, any risk of the cushioning material adversely affecting the sealing operation or vice-versa is minimized and an improved seal may be effected.

The cushioning material 34 is preferably introduced into passageway 54 under pressure so that as the cushioning material 34 flows into the tube 30, it substantially fills the tube and substantially surrounds the optical fiber or fibers 32. Cushioning material 34 helps position the fiber or fibers 32 within the tube. Any suitable mechanism not shown can be used to supply the cushioning material 34 under pressure to passageway 54.

Although the cushioning material 34 may be introduced into passageway 54 in substantially any form and at substantially any desired temperature, it has been found to be desirable to insert the cushioning material 34 into the passageway 54 in a heated condition. This heated condition improves the flow-ability of the cushioning material 34 by making the cushioning material more fluid. Any suitable conventional heating device not shown may be used to heat the cushioning material 34 either before or after it enters the passageway 54. Any suitable cushioning material known in the art, preferably petroleum jelly or a similar gel-like substance, may be used for cushioning material 34.

While a particular method and apparatus for inserting at least one optical fiber and a cushioning material into a formed tube has been discussed, there are other suitable alternative processes and apparatuses which may be used to insert at least one fiber with or without a cushioning material into a tube. Several of these alternative processes and apparatuses are described and illustrated in U.S. patent application Ser. No. 413,846 filed Sept. 1, 1982 to Winter et al. which is hereby incorporated by reference.

After the containment tube 30 with one or more optical fibers 32 and a cushioning material 34, if one is used, has been assembled, it may be surrounded by one or more additional layers. For example, a dielectric layer 36 may be fabricated about the tube 30. A typical cable construction will have such a dielectric layer if the tube 30 is to be used as an electrical conductor. Dielectric layer 36 may be fabricated in any suitable conventional manner using any suitable conventional apparatus. For example, dielectric layer 36 may be extruded about the cable core by any suitable extruding arrangement 66 in a conventional manner. The dielectric layer 36 preferably comprises a high density polyethylene, although any suitable material may be used. If tube 30 is not used as an electrical conductor, the dielectric layer 36 may be omitted.

As shown in FIGS. 7 and 8, the cable may be provided with a loadbearing layer 38. If a dielectric layer 36 is provided, the loadbearing layer is preferably fabricated about it. The loadbearing layer serves as the primary tensile element in the cable, although some fraction of the total load may be carried by the tube 30. This layer also acts as an abrasion-resistant layer which completely covers and protects the cable core. Any suitable material such as polyethylene, polyamides, polyimides, epoxies, and other similar plastic materials may be used for the layer 38. In a preferred embodiment, this layer comprises a contrahelix of plastic filaments sold under the trademark KEVLAR by DuPont contained in a matrix of thermosetting epoxy. The fabrication of this layer may be done in a known manner by any suitable fabrication device 68, i.e. fabricating an annulus utilizing a die arrangement.

The cable is generally provided with an outer covering 39. The outer covering 39 serves as a barrier to water intrusion and defocuses external cutting or abrading forces. The outer covering 39 may be formed from any suitable material such as an elastomeric material. The outer covering 39 may be fabricated in any well known manner by any conventional apparatus known in the art. For example, outer covering 39 may be extruded in a conventional manner by a conventional extrusion apparatus 70. In a preferred embodiment, covering 39 comprises a layer of black polyurethane. FIG. 8 shows an embodiment of a finally assembled cable.

An optical fiber cable formed in accordance with the above-mentioned technique may contain any desired number of optical fibers. Generally, the tube 30 contains from one to six optical fibers. Preferably, each optical fiber 32 comprises a photo-conductor glass rod; however, any suitable optical fiber with or without a buffer material around the optical fiber may be used in the cable. Where the buffer material surrounding the optical fiber substantially occupies the internal tube area, the cushioning material 34 may be omitted. In addition to or in lieu of one or more of the fibers, the tube 30 may contain one or more electrical conductors such as a copper conductor not shown. The electrical conductor or conductors may be inserted in any suitable fashion.

An optical fiber cable generated by the aforementioned technique theoretically can have a substantially infinite length. This technique can be used to fabricate cable lengths of about 25 km. between repeaters. The cable can be used underground, aboveground, undersea or in any other environment. For example, it may be used to supply data support and power to a deep sea sensor. It may also be used for underground, aboveground, and undersea telephone applications.

While the optical fiber communication cable has been shown as having a dielectric layer, a load-bearing layer and an outer covering, any number of protective layers including another metallic type layer may be fabricated about the tube 30.

A tube formed in accordance with the instant invention may have any desired diameter to thickness ratio. For optical fiber cable applications, the diameter to thickness ratio preferably is from about 5:1 to about 25:1 and most preferably is from about 10:1 to about 20:1.

The tube 14 or 30 may be formed from any desired metal or metal alloy. For optical fiber cable applications, the tube material preferably has a conductivity in the range of about 25% to about 102% IACS and a yield strength of at least about 30 ksi and, preferably, at least about 50 ksi. Preferably the metal tube has a yield strain of less than about 1%, and most preferably about 0.3% to about 0.95%.

While the invention is particularly applicable to a range of metals and alloys, it is preferably applied to high strength copper alloys. It has already been noted that it is desirable that the yield strain, which is the strain at the yield strength at 0.2% offset, should be less than about 1% and, preferably, as close as possible to 1%. Copper alloys because they have a lower modulus of elasticity can achieve this yield strain limitation without the necessity of going to extremely high strengths as, for example, might be required with stainless steel. This results in a unique combination of properties for the resultant tube, namely it has very high strength but not so high as to prevent its being formed from a metal strip. Further, it has a high yield strain to prevent damage to the fiber in use.

Preferably, the alloy should have good resistance to softening upon short-term exposure to elevated temperatures so that it will not lose significant strength during the sealing operation. Further, for certain applications where conductivity is not of significant importance the yield strength of the tube should be at least about 100 ksi and most preferably at least about 150 ksi.

A number of metals and alloys possess the required combinations of strength conductivity such as copper and its alloys and steel, e.g. stainless steel and may, therefore, be utilized. In a preferred embodiment the material forming the tube 30 comprises a high copper alloy containing zirconium, designated as Copper Alloy 151. Copper Alloy 151 has a conductivity of about 95% IACS, a yield strength of about 62 ksi, and a yield strain of about 0.36%.

Suitable copper alloys in accordance with this invention having the requisite strength and softening resistance comprise alloys drawn from the following systems: copper-zirconium, copper-chromium, copper-iron, copper-silver, copper-magnesium-phosphorus, copper-nickel-silicon, etc. Generally, in such copper alloy systems copper is present in an amount of at least about 95% and represents the balance of the alloy. The alloying elements may be selected from the group consisting of zirconium, chromium, iron, magnesium, phosphorus, nickel, silicon, tin and silver as well as combinations thereof. For applications where a moderate strength level and a conductivity greater than about 50% IACS are needed, the alloying elements should preferably be present in an effective amount to provide the desired strength and softening resistance up to about 5% by weight of the alloy and most preferably in such an effective amount up to about 3% by weight of the alloy.

In addition to the previously described Alloy 151, other suitable materials include Alloys 155, 194 and 195. In addition other high strength copper alloys such as Alloys 638 and 654 can be used for very high strength applications. Alloy 638 includes aluminum, silicon and cobalt within the aforenoted range while Alloy 654 includes silicon, tin and chromium also within that range. In accordance with this invention, the metal tube should preferably be formed from a material having a minimum of 45 ksi tensile strength at 400° F. in order to be properly processable in accordance with this invention which involves heating the tubing during soldering while it is maintained under high tension.

The strip 12 from which the tube is formed may have any suitable cross section configuration. If desired, one or more of the edge portions of the strip may be shaped to reduce the drawing forces on the strip 12. It has been found to be quite advantageous to form tube from a strip 12 having an initial transverse cross-sectional area of about 5% to about 20% greater than the desired transverse cross-sectional area of the tube to be formed. The strip cross-sectional area is preferably about 8% to about 17% and most preferably about 10% to about 15% greater than the cross-sectional area of the formed tube. Inherently with the tube-forming techniques used herein the extra volume of metal provided by the excess cross-sectional area or strip width shows up essentially as longitudinal extension of the resulting tube. It has been found that using the tube-forming techniques described herein there is no significant change in wall thickness. The wall thickness of the resultant tube is substantially the same as the thickness of the starting strip 12. The tube-forming techniques described herein are, therefore, similar in some respects to "tube sinking". The total length of tube 14 or 30 produced by the tube-forming techniques of this invention will be greater than the total length of the starting strip 12 due to the aforenoted longitudinal extension of the tube 14 or 30. The amount of the tube extension corresponds substantially to the aforenoted percentage differentials in strip cross-sectional area versus tube cross-sectional area.

This extra volume of metal also inherently assists in the formation of a tube having a relatively tight seam 16 without a notch or well at the outer periphery of the seam 16. Further, the edges 24 of the metal tube 14 are inherently deformed by the tube-forming techniques described above to provide substantially non-linear and intermeshing edges 24' and 24" as shown. This results in an increased surface area of the edges to which the sealing material can adhere as compared to the original strip 12 edges thereby improving the resultant strength of the seal. This also results in better hermeticity than prior cable core assemblies.

The deformed intermeshing edges 24' and 24" are the inherent result of the processing in accordance with the above described techniques and do not correspond to the shape of the original strip edges. The deformed edges 24' and 24" result from the drawing or sinking of the tube by the process of this invention.

In contrast, a tube formed by folding even with the use of a die forming technique would not have such deformed edges since in a folding operation the starting strip would not include the excess material which the process of this invention converts into longitudinal extension by drawing or sinking. It is believed that a deficiency of the folding technique is that a well or depression occurs at the outer surface along the seam. In accordance with this invention, the presence of excess material from the metal strip causes the outer surface to form against the die so as to eliminate such a well or depression along the seam. This is highly significant since it reduces the amount of solder or brazing material which would be required to provide a circular outer periphery to the resultant tube.

During passage of the material forming the strip 12 and the open tube section 14' through the dies 18 and 20, the material tends to become more work hardened. As a result, mechanical properties of the material such as its temper and its yield strength tend to increase.

While the tube forming technique of the instant invention has been shown as having the dies 18 and 20 in series, it is possible to perform the process of the instant invention with the dies not in a series arrangement.

While the open tube section 14' has been shown as having a particular configuration, it may have other configurations, e.g. egg-shaped section.

While the tube forming apparatus has been shown as having a sealing station, the sealing station may be omitted where a joint between the edges is not required, i.e. where only hydrostatic pressure is involved, the edges are shaped to effect a mechanical interlock, or an outer sealant covering is used.

While the invention has been exemplified with respect to the use of a die for forming the open tube section 14', if desired, roll forming could be employed to form the open tube section. The final forming of the open tube section into the circular tube, however, should be by die forming as described.

The patents, publications and patent applications set forth in the specification are intended to be incorporated by reference herein.

It is apparent that there has been provided in accordance with this invention optical fiber cable assemblies which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An optical fiber cable comprising:
   a substantially cylindrical tubular structure having a desired diameter and a generally longitudinally extending seam defined by spaced apart edges in close proximity;
   said structure being formed from a metal or metal alloy strip;
   said edges being placed in said close proximity by forces within said metal or metal alloy forming said tubular structure;
   said forces being created by initially forming said strip into an open tubular section having a minor diameter less than said desired diameter, a major diameter greater than said desired diameter and two legs forming an opening and subsequently forming said open tubular section into said substantially cylindrical tubular structure; and
   at least one optical fiber within said tubular structure.

2. The optical fiber cable of claim 1 further comprising:
   said forces being created by stresses acting on a portion of said tubular structure opposed to said longitudinally extending seam.

3. The optical fiber cable of claim 1 further comprising:
   a cushioning material substantially surrounding each said fiber and substantially filling said tubular structure, said cushioning material being deposited into said tubular structure after formation of said structure.

* * * * *